(12) United States Patent
Mazzitelli (10) Patent No.: US 10,554,510 B2
(45) Date of Patent: Feb. 4, 2020

(54) ENABLING ADDITIONAL METRICS IN A MONITORING SYSTEM TO DIAGNOSE PROBLEMS

(71) Applicant: Red Hat, Inc., Raleigh, NC (US)

(72) Inventor: John Mazzitelli, Sicklerville, NJ (US)

(73) Assignee: Red Hat, Inc., Raleigh, NC (US)

( * ) Notice: Subject to any disclaimer, the term of this patent is extended or adjusted under 35 U.S.C. 154(b) by 211 days.

(21) Appl. No.: 15/438,835

(22) Filed: Feb. 22, 2017

(65) Prior Publication Data

US 2018/0241649 A1 Aug. 23, 2018

(51) Int. Cl.
*H04L 12/16* (2006.01)
*H04L 12/26* (2006.01)

(52) U.S. Cl.
CPC .................. *H04L 43/024* (2013.01)

(58) Field of Classification Search
CPC ....... H04L 43/103; H04L 41/06; H04L 41/14; H04L 43/00; H04L 43/04; H04L 43/065; H04L 43/0817; H04L 43/10; H04L 43/12; H04L 43/16; G06F 11/0766; G06F 11/3003; G06F 2201/865
See application file for complete search history.

(56) References Cited

U.S. PATENT DOCUMENTS

| 8,086,708 | B2 | 12/2011 | Breitgand et al. |
| 8,250,408 | B1 | 8/2012 | Cohen et al. |
| 8,972,787 | B2 | 3/2015 | Mahesh et al. |
| 9,135,135 | B2 | 9/2015 | Rao et al. |
| 9,223,681 | B2 | 12/2015 | Delporte |
| 9,319,911 | B2 * | 4/2016 | Gupta ..................... H04W 24/08 |
| 9,391,848 | B1 * | 7/2016 | Shazly ................ H04L 41/5009 |
| 9,729,493 | B1 * | 8/2017 | Soundararajan ........ H04L 51/32 |
| 9,929,998 | B1 * | 3/2018 | Soundararajan ...... H04L 41/044 |
| 2002/0183972 | A1 * | 12/2002 | Enck ................... G06F 11/3409 |
| | | | 702/186 |
| 2005/0119996 | A1 * | 6/2005 | Ohata ................. G06F 11/3495 |

(Continued)

OTHER PUBLICATIONS

Kemnetz, John et al., "Automatically Enable Diagnostic Settings at resource creation using a Resource Manager Template", https://docs.microsoft.com/en-us/azure/monitoring-and-diagnostics/monitoring-enable-diagnostic-logs-using-template, Nov. 22, 2016, 6 pages.

(Continued)

*Primary Examiner* — Shean Tokuta
(74) *Attorney, Agent, or Firm* — Lowenstein Sandler LLP (57) ABSTRACT

Systems and methods for enabling additional metrics in a monitoring system to diagnose problems are disclosed. An example method may include collecting first metric data at a first collection frequency, determining whether the first metric data exceeds a first boundary defined by a first metric rule, responsive to determining that the first metric data exceeds the first boundary, collecting second metric data at a second collection frequency and collecting the first metric data at a third collection frequency, the second metric data and the third collection frequency defined by the first metric rule, determining whether the first metric data no longer exceeds the first boundary, and responsive to determining the first metric data no longer exceeds the first boundary, terminating collection of the second metric data while continuing to collect the first metric data at the first collection frequency.

22 Claims, 7 Drawing Sheets

(56) References Cited

U.S. PATENT DOCUMENTS

| | | | |
|---|---|---|---|
| 2008/0225829 A1* | 9/2008 | Sachs | H04W 48/18 370/351 |
| 2009/0222492 A1 | 9/2009 | Yamauchi et al. | |
| 2013/0179893 A1* | 7/2013 | Ferdous | G06F 11/3089 718/104 |
| 2015/0048952 A1* | 2/2015 | Murphy | G01M 13/045 340/682 |
| 2015/0065121 A1* | 3/2015 | Gupta | H04W 24/08 455/424 |
| 2015/0323344 A1* | 11/2015 | Arlitt | G01D 4/00 340/870.02 |
| 2016/0020976 A1* | 1/2016 | Gamage | H04L 43/12 709/224 |
| 2016/0094401 A1* | 3/2016 | Anwar | H04L 41/142 709/223 |
| 2016/0204992 A1* | 7/2016 | Wu | H04L 41/14 709/224 |
| 2017/0112390 A1* | 4/2017 | Cho | A61B 5/0215 |
| 2017/0284689 A1* | 10/2017 | Steele | E02D 29/12 |
| 2018/0087909 A1* | 3/2018 | Do | G01C 21/206 |
| 2018/0146626 A1* | 5/2018 | Xu | G06Q 10/06 |
| 2018/0307579 A1* | 10/2018 | Rothchilds | G06F 11/3495 |

OTHER PUBLICATIONS

"Worry-Free Business Security Server 8.0 Help", http://docs.trendmicro.com/all/smb/wfbs-s/v8.0/en-us/wfbs_8.0_olhsrv/trb_sht_resrce_diag_tool.html, 1 page.

"JBoss Operations Network 3.0.1 Setting up Monitoring, Alerts, and Operations: for Monitoring Resources and Responding to Incidents", https://access.redhat.com/documentation/en-US/JBoss_Operations_Network/3.0/html-single/Setting_up_Monitoring_Alerts_and_Operations/index.html#enabling-disabling-metrics, Dec. 7, 2011, 58 pages.

"DTrace", Wikipedia, https://en.wikipedia.org/wiki/DTrace, Jan. 2005, 5 pages.

* cited by examiner

ENABLING ADDITIONAL METRICS IN A MONITORING SYSTEM TO DIAGNOSE PROBLEMS

TECHNICAL FIELD

The disclosure is generally related to computing devices, and is more specifically related to enabling additional metrics in a monitoring system to diagnose problems.

BACKGROUND

Computing systems, such as enterprise computing systems, continue to grow in scale and complexity of their components and interactions. Enterprise computing systems and services exhibit complex behaviors stemming from the interaction of workload, software structure, hardware, network traffic conditions, and system goals, such as service level objectives and agreements. A systems management product is employed in a networked enterprise computing system to administer and monitor different servers running on the network. For example, a system management product can monitor an application server or Web server and determine how much memory is being used, whether a server has crashed, and/or the general state of the running server. When the system management product is monitoring systems (such as the application server or Web server above), there is a balance between collecting enough metrics to provide useful data, but not collecting too much data that could place a high load on the monitored system, as well as flood a monitoring system of the system management product.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for enabling additional metrics in a monitoring system to diagnose problems. A systems management product may be employed in a networked enterprise computing system to administer and monitor different servers and/or components running on the network. For example, a system management product can monitor an application server or Web server and determine how much memory is being used, whether a server has crashed, and/or the general state of a running server. When the system management product is monitoring such systems, there is a delicate balance between collecting enough metrics to provide useful data, but not collecting too much data that could place a high load on the managed system as well as overloading the system management product with collected data to analyze.

Conventional systems for monitoring computing systems, such as enterprise computing systems, collect metrics at a determined frequency (referred to as a "collection frequency") that is manually configured. For example, a conventional monitoring system may be configured as follows: (a) for each application server, collect the heap memory used metric every five minutes, and (2) for each computer device, collect the CPU usage metric every two minutes, and so on. There are many different types of metrics that could be collected, limited by what a managed resource exposes (e.g., in the above example, the managed application server exposes the heap memory used metric in order for the monitoring system to collect that metric). These conventional systems for monitoring and metric collection either provide a default set of metrics to collect (and the frequency of collection) or an end user (such as a system administrator) configures the system with this information. The monitoring system then collects these metrics at that configured frequency and continues to do so until an end user manually changes that configuration.

A problem that arises with these conventional systems is that they do not provide an optimal balance between collecting enough metrics to identify when problems occur, while avoiding collecting too much data that can result in inefficiencies in the managed resources and the monitoring system. These inefficiencies could include: slowing down processing time of the managed resources and/or monitoring system; and/or causing noise (due to excess data collection) in the collected data that makes the data difficult to analyze quickly and efficiently. Furthermore, the conventional systems are slow to respond to potential problems arising in a managed resource, as they utilize end user manual intervention to update metric collection configurations.

Implementations of the disclosure provide for automated adjustment of enabled metrics and associated collection frequencies. Implementations of the disclosure automate metric collection so that collection of different types of metric data is automatically increased, without user intervention, as soon as a problem is detected. Similarly, when a monitored managed resource returns to operating in a normal state, implementations of the disclosure automatically reduce the amount of metrics collected. As such, implementations of the disclosure reduce the amount of collected metrics at the same time as providing prompt response and identification of potential operational problems in a managed resource.

Implementations of the disclosure provide a technical improvement over the conventional systems by improving monitored data collection and analysis on systems management devices providing monitoring services. Monitored data collection and analysis may be improved via initially monitoring a base level metric and automatically increasing other metric collection as warranted by the monitored observations of the base level metric. Furthermore, implementations of the disclosure improve processing speed (i.e., more efficient processor usage due to less metric data collection requests) and computing system resource usage (i.e., less storage and less memory utilized due to less metric data collection) of the underlying computing device. In addition, improved network bandwidth (by reducing the amount of metric data collected and transmitted) can result from implementations of the disclosure.

Figure 1:
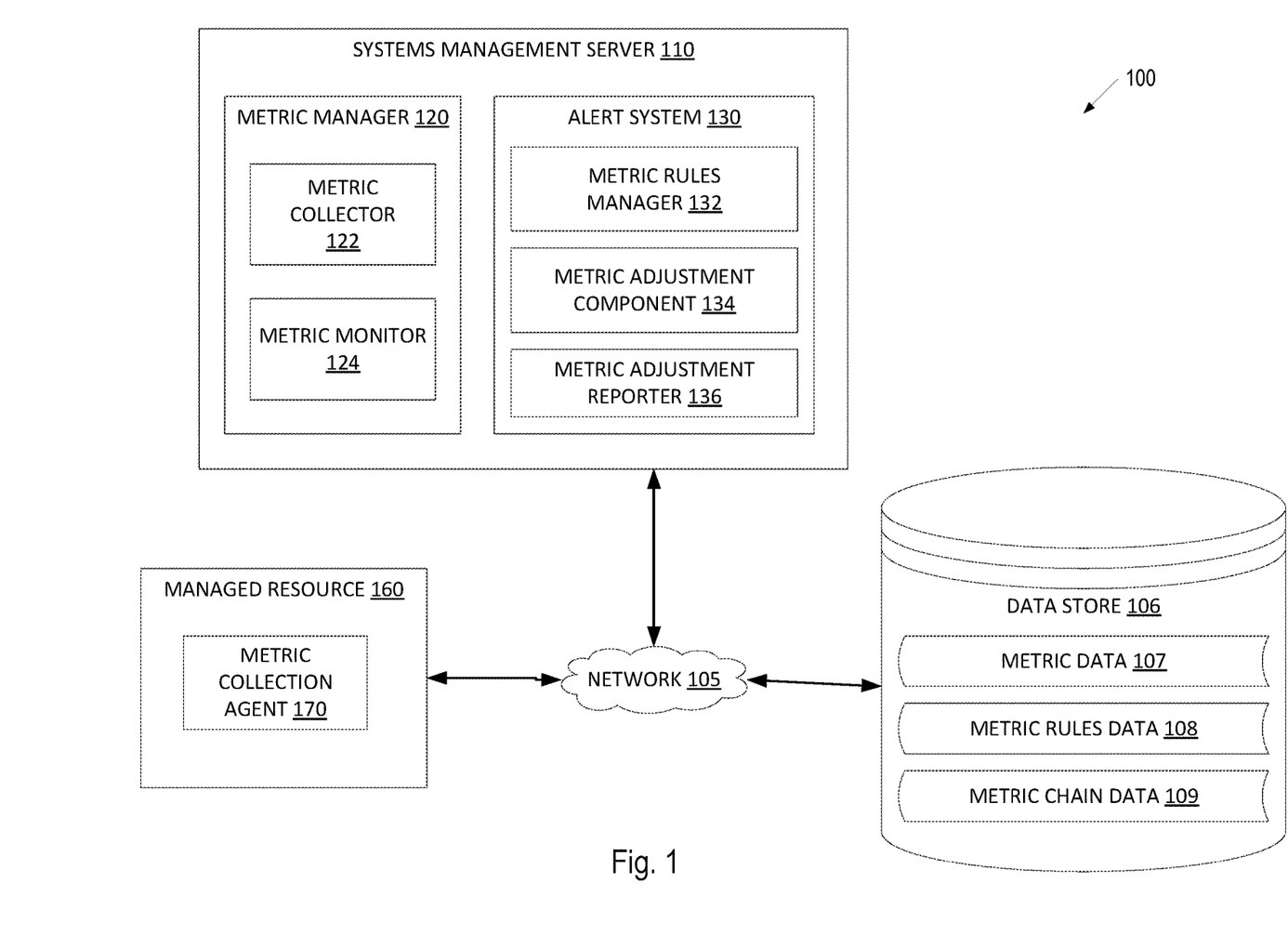
FIG. 1 depicts a high-level diagram of an example distributed computing system in accordance with one or more aspects of the disclosure.

FIG. 1 illustrates an example distributed computing system 100, in which implementations of the disclosure may operate. The distributed computing system 100 may include a systems management server 110, a managed resource 160, a network 105, and a data store 106. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The systems management server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable additional metrics to diagnose problems in a monitoring system.

The managed resource 160 may include an enterprise computing device such as a server computer, an application server, a virtual machine, a database, a data store, networks, software components, and/or hardware components. The managed resource 160 may further include other types of computing devices, such as personal computer (PC), laptop, mobile phone, smart phone, tablet computer, netbook computer, network-connected television, etc. In some implementations, managed resource 160 may also be referred to as a monitored device or monitored server. The data store 106 may include metric data 107, rule data 108, and metric chain data.

In one implementation, the systems management server 110 may include a metric manager 120 and an alert system 130. The metric manager 120 may include a metric collector 122 and a metric monitor 124. The alert system 130 may include a metric rules manager 132, a metric adjustment component 134, and a metric adjustment reporter 136. More or less components may be included in the system management server 110 without loss of generality. For example, two of the components may be combined into a single component, or one of the components may be divided into two or more components. In one implementation, one or more of the components may reside on different computing devices (e.g., different server computers, on a single client device, or distributed among multiple client devices, etc.).

The managed resource 160 is communicatively coupled to the systems management server 110 and the data store 106. For example, the managed resource 160 may be coupled to systems management server 110 and the data store 106 via a network (e.g., via network 105). In one implementation, the managed resource 160 includes a metric collection agent 170. More or less components may be included in the managed resource 160 without loss of generality. For example, two of the components may be combined into a single component, or one of the components may be divided into two or more components. In one implementation, one or more of the components may reside on different computing devices (e.g., different server computers, on a single client device, or distributed among multiple client devices, etc.). Furthermore, for ease of explanation herein, a single managed resource 160 is illustrated as communicably coupled to systems management server 110. However, more than one managed resource 160 may be communicably coupled to the system management server 110.

In one implementation, the systems management server 110 may provide for automated adjustment of enabled metrics and their associated collection frequencies (e.g., time intervals) for the managed resource 160. Metric manager 120 of system management server 110 may collect metric data (e.g., values representing measurement of the metric) of a metric of the managed resource 160. The metric data may be collected by the metric manager 120 at a determined frequency (e.g., every 5 seconds, every minute, etc.) (which may be referred to herein as a "collection frequency" or "collection interval"). In one implementation, the collected metric and the determined collection frequency are configured via metric rules maintained in metric rules data 108 of data store 106. For example, a systems administrator may configure the metric manager 120 to collect metric data via a metric rule stored in metric rules data 108. The metric rule may identify the metric data to collect as well as the associated collection frequency for collecting the metric data.

There are many different types of metrics that could be collected from a managed resource 160 based on information and/or data exposed by the managed resource 160. For example, a metric may include, but is not limited to, a number of executing threads in a virtual machine (such as a JAVA virtual machine (JVM)), an amount of disk space that is free/unused on a file system, a current network adapter throughput, a number of processes currently running on an operating system, a number of queries executed by a database, a request response time for a web application, and so on.

A metric collection agent 170 executing on the managed resource 160 may operate in conjunction with metric collector 122 of the metric manager 120 to enable the metric collection. For example, metric collection agent 170 may be provided with instructions (e.g., from metric collector 122) to provide metric data for a first measured metric at a first determined collection frequency. Metric collection agent 170 would then push (e.g., transmit) the metric data of the first measured metric to the metric collector 122 at a collection frequency defined by the first determined collection frequency. This is referred to as a push model. In one implementation, the metric collector 122 may request (e.g., from the metric collection agent 170 or directly from the managed resource 160) the metric data for the first measured metric at time intervals defined by the first determined collection frequency. This is referred to as a pull model. In one implementation, the collected metrics may be stored as metric data 107 in data store 106.

In one implementation, metric monitor 124 monitors the metrics collected (e.g., metrics data 107) by metric collector 122. Metric monitor 124 may access and reference metric rules data 108 to identify particular metrics to monitor from the collected metrics. As discussed above, metric rules data 108 may store one or more metric rules that can include identification of a metric, an associated boundary for the identified metric, and a condition to implement when the identified metric goes outside of the associated boundary. A boundary may refer to a range of values of metric data that indicate the metric is within a "normal" operating range. When values of the metric data go beyond (exceed, etc.) the identified boundary (or boundaries), this may indicate the metric is not within a "normal" operating range. A normal "operating" range may be based on historical data of a metric or may be pre-configured for the metric. Basing the normal "operating" range on historical data allows for automatic adjustments of metric conditions. For example, if the average CPU utilization of a computing device is 75% in the past week, a metric "out of bounds" condition can be considered to be 76% or higher. However, if the following week the average CPU utilization drops to 50% (perhaps a new upgrade was installed to the system that lowered CPU use), then the metric rule can automatically adjust itself so that an "out of bounds" condition can be considered to be 51% or higher.

In one implementation, when metric monitor 124 determines that metric data has been collected for a metric that corresponds to a metric rule in metrics rule data 108, the metric monitor 124 may notify alert system 130. As discussed above, alert system 130 may include a metric rules manager 132, metric adjustment component 134, and metric adjustment reporter 135.

In response to receiving a notification from metric monitor 124 of collection of metric data corresponding to metric rules data 108, the metric rules manager 132 analyzes the collected metric data in view of the metric rules. In one implementation, metric rules manager 132 determines whether the collected metric goes beyond (e.g., exceeds) the boundary (or boundaries) specified in the corresponding metric rule for that metric. If so, then metric adjustment component 134 causes one or more additional metrics to be enabled (e.g., instruct metric manager 120 to begin collecting the additional metrics from managed resource 160) according to the corresponding conditions of the metric rule. The one or more additional metrics to collect specified as conditions in the metric rule may be referred to as a set of metric(s) (e.g., first set of metrics, second set of metrics, etc.).

In some implementations, the metric adjustment component 134 may adjust the collection frequency of the currently-collected metric(s) as well, as defined by the metric rule. The adjustment of collection frequencies by the metric rule allows for more fine-grained collection of metric data when an issue or problem arises.

In some implementations, the additional set of metric(s) to enable may also have corresponding boundaries defined (e.g., via another metric rule stored in metric rules data 108). If the values for the additional set of metric(s) exceed their specified boundaries, further additional metrics may be enabled, and so on. This is referred to herein as a metric chain, a chain of metrics, a nested metric chain, and/or a nested chain of metrics. The metric chain described herein can be utilized to identify occurrence of a problem (or more than one problem) in the operation of the managed resource 160.

In one implementation, when the monitored metric values return to an in-bound range with respect to the boundary in the associated metric rule for the monitored metric, the chain of metrics can begin to "unwind". Unwinding the nested chain of metrics may refer to the metric adjustment component 134 disabling the additional set(s) of metrics that were previously enabled when a monitored metric had metric values that were "out of bounds" (i.e., exceeded boundary of metric rule) with respect to the defined boundary values in the associated metric rule. Unwinding may also refer to returning collection frequencies of collected metrics back to their original collection frequencies.

The metric rules manager 132 may monitor the state of each current metric chain implemented by the alert system 130 using metric chain data 109 in data store 106. For each implemented metric chain, metric chain data 108 may identify an original monitored metric of the metric chain as well as the subsequent additional metrics (e.g., first set of metric(s), second set of metric(s), etc.) and associated collection frequencies enabled for the original monitored metric. Metric chain data 109 may also store a level of nesting in the metric chain for each set of enabled metric(s) in the metric chain (e.g., original monitored metric is level 0, first set of metric(s) is level 1, second set of metric(s) is level 2, and so on).

As the metric rules manager 132 is notified of the monitored metrics (i.e., via notifications sent from metric monitor 124 as described above), the metrics rules manager can determine when a collected metric in a current metric chain returns to an "in-bounds" status with respect to the boundary of the metric rule corresponding to the metric, and notify the metric adjustment component 134 accordingly. The metric adjustment component 134 can cause the additional metric(s) (that were enabled when the monitored metric was out of bounds) to be disabled (i.e., metric data is not collected for that metric at the managed resource 160) and any adjusted collection frequencies to be re-adjusted back to original collection frequency values. In one implementation, the metric rules manager 132 and metric adjustment component 134 unwind a nested chain of metric in a reverse order that the additional set(s) of metrics in the chain were enabled. For example, before the second to last-enabled set of metric(s) can be disabled, the last set of metric(s) should be disabled, and so on. Once all metrics are unwound, the original monitored metric remains enabled at the original collection frequency. The metric chain can then be re-enabled according to the metric rule(s), as described above, when the original monitored metric goes out of bounds again.

In one implementation, metric adjustment reporter 136 generates a notification (e.g., a report, alert, etc.) when a monitored metric goes out of bounds per a configured metric rule. The notification may identify the metric that is out of bounds, as well as the additional enabled metrics. In some implementations, values of the collected metric data is also provided as part of the notification. The notification may be sent to a system administrator or other end user of the systems management server 110 and/or managed resource 160. The notification may be provided in the form of a pop-up window, an e-mail message, a short message service (SMS) message, a multimedia messaging service (MMS) message, a telephone message, and/or any other type of notification format.

An illustrative example of the implementation of a nested metric chain and its associated unwinding is described below. In this example, the managed resource 160 may implement a storefront web application that accesses a backend database (e.g., another managed resource 160) for product and customer order information. The "system" (i.e., managed resources 160 of the storefront web application and the backend database) is currently running normally. The systems management server 110 may monitor these managed resources 106 by initially collecting a single metric: "Average Response Time." The "Average Response Time" metric determines how fast the system responds to a customer browser request, on average. The storefront web application (hereinafter referred to as "the application") has a condition that its average response times should not exceed 1 second. This condition correlates to a boundary (in a metric rule for the "Average Response Time" metric) of 1 second or less response time. As such, the "Average Response Time" metric is considered to be "out of bounds" when the response time exceeds 1 second. In the example, a metric rule for the "Average Response Time" may be enabled by systems management server 110, with a collection frequency of 5 minutes, and a boundary of 1 second.

As the system is initially running normally in the example, the system management server 110 does not collect any other metric data. As long as the system is responding to all customer requests within 1 second, the systems management server 110 considers the system to be operating normally with no known problems. However, if the response times start going above 1 second (i.e., exceeding the boundary defined in the metric rule), that is an indicator to the systems management server 110 that something is potentially wrong. As a result, the metric rule further defines additional metrics to collect in response to the monitored metric going "out of bounds" (i.e., response times are above 1 second).

In addition, the metric rule may define a new collection interval for the original collected metric of "Average Response Time". In the example, the new collection frequency for the "Average Response Time" metric may be reduced to every 60 seconds by the metric rule when "Average Response Time" metric values are "out of bounds". In some implementations, the metric rule may adjust the collection interval to be less frequent (e.g., every 10 minutes for "Average Response Time" in the example) as other additional metrics are being enabled that can help determine the problem. Thus, additional metric values related to "Average Response Time" may be not help to determine the problem and thus are collected less frequently to reduce the amount of data being collected and stored.

In the example, a first additional metric (i.e., first set of metrics) to enable may be "Average database query time". The "Average Database Query Time" metric refers to the average time it takes for the database to return results from a query. In the example, if the backend database is slow, it can affect the customer experience on the application and its associated website. If the systems management server 110 determines that customer experience is degraded (e.g., slow response time), the systems management server 110 can likewise immediately determine if it is the backend database that is the problem. As such, when the "Average Response Time" original monitored metric is above 1 second, the systems management server 110 can automatically (i.e., without user intervention) enable the "Average Database Query Time" metric and start collecting this additional enabled metric every six seconds. The six second collection frequency may be specified in another metric rule corresponding to the "Average Database Query Time".

This other metric rule may further specify a corresponding boundary for the "Average Database Query Time" metric of 500 milliseconds. It may be known (e.g., using historical performance record, configured settings, etc.) that the average DB query under normal operating conditions for the system takes less than 500 milliseconds. As such, the 500 milliseconds is the "in-band" metric value and boundary for the metric rule corresponding to the "Average Database Query Time" metric. If the "Average Database Query Time" takes longer than 500 milliseconds it is considered "out of bounds" per the metric rule and the systems management server 110 is aware that something is wrong with the backend database.

On the other hand, if the backend database is not the only possible source of a problem with the original monitored metric of the "Average Response Time" being out of bounds, other metrics can additionally be enabled as part of the first set of metrics that includes the "Average Database Query Time" metric. In the example, another possible issue (That could cause the "Average Response Time" to go out of bounds) may be the operating system running out of RAM memory.

As a result, in the example, another metric that can be enabled as part of the first set of metrics when "Average Response Time" is above 1 second is the "Memory Used" metric. It may be known (e.g., using historical performance record, configured settings, etc.) that under normal operating conditions, memory used by the application should not exceed 75% (that is, under normal conditions, up to 75% of all available RAM memory is being used). As such, the 0% to 75% range is the "in-band" metric value and boundary for the metric rule corresponding to the "Memory Used" metric. If the "Memory Used" exceeds 75%, the "Memory Used" metric is considered "out of bounds" per the metric rule for the "Memory Used" metric and the systems management server 110 is aware that something is wrong with the managed resource 160 running the application. The metric rule for the "Memory Used" metric may further specify a collection frequency of 30 seconds of this metric.

In summary, the example described above implements the following metric chain:

(1) Start by collecting "Average Response Time" metric every 5 minutes;

(2) If "Average Response Time" metric exceeds 1 second, automatically and immediately (i.e., no user intervention) adjust "Average Response Time" collection frequency to every 60 seconds and start collecting:

(2a) "Average Database Query Time" every 60 seconds; and (2b) "Memory Used" every 30 seconds The example may be further expanded to add more metrics to the metric chain. Suppose the "Average Database Query Time" is observed to be 2 seconds. Per the metric rule described above for the "Average Database Query Time" metric, that metric value is out of bounds. The example described above may further specify other metrics in the metric rule for the "Average Database Query Time" metric to automatically start getting collected at that time (e.g., "Disk Space Used" metric (e.g., it may be known that if disk space is low, database query times increase)). Similarly, if the "Memory Used" metric is observed to be over 75% (i.e., out of bounds per "Memory Used" metric rule), the example may be further expanded to start collecting the "Number of Processes Running" metric (e.g., a hacker may have spawned numerous Trojan horses recently and the extra processes attributable to the Trojan horses are the cause of the extra memory being used, which in turn caused our web application response times to slow).

Note that once the metrics are observed to be operating within the "in bounds" metric values (e.g., maybe a system administrator logged into the machine and killed the Trojan processes, or maybe the administrator deleted old log files that freed up disk space), the additional metrics can be automatically disabled (i.e., no user intervention) by the systems management server 110 in an order that the metrics are enabled in the metric chain. Eventually, all additional metrics in the metric chain may be disabled except for the original monitored metric if "Average Response Time" is less than one second. Once the "Average Response Time" metric is within "in bounds" observed values (i.e., under 1 second), this metric is the single collected metric and the collection frequency for this metric can be readjusted back to the original collection frequency of 5 minutes. The systems management server 110 may then continue monitoring the collected values for the "Average Response Time" metric to determine if it goes back out of bounds per the metric rule. If so, the process described above for the example repeats.

As shown in the above example, when the system is operating normally, the original monitored metric of the "Average Response Time" is the single collected metric by the systems management server 110. The additional metric (i.e., "Average Database Query Time", "Memory Used", "Disk Space Used", "Number of Processes Running", etc.) are not initially enabled by the systems management server 110. The system management server 110 automatically enables those additional metrics in an informed and efficient manner when the managed resources 160 (that are implementing the application and the backend database in the example) begin exhibiting signs of degradation. In addition, the systems management server 110 automatically disables those additional metrics once the managed resources 160 are observed to be operating in a normal range of observed metrics. As such, processing time and resources of the systems management server 110 are conserved and implemented in a more efficient manner.

Figure 2:
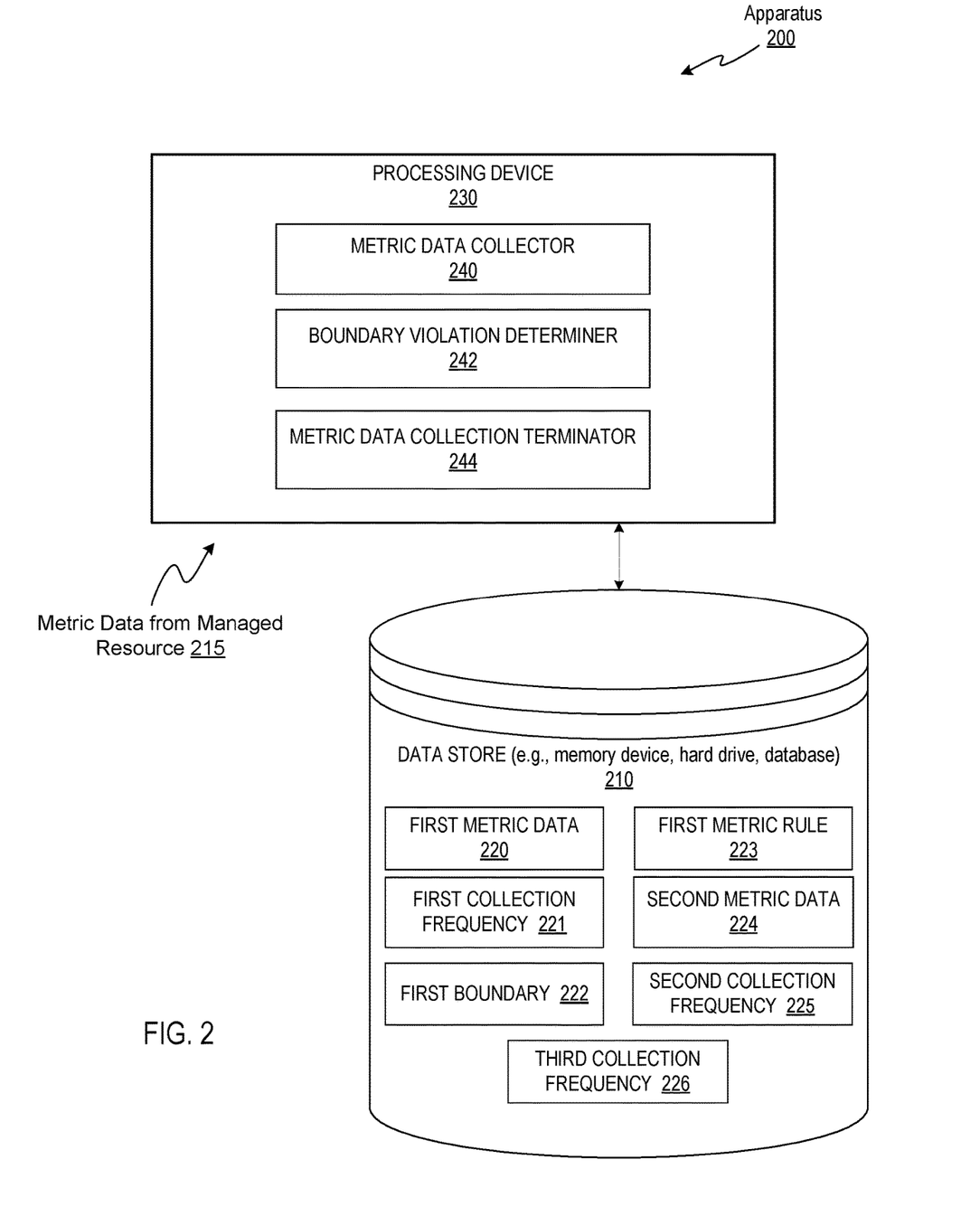
FIG. 2 schematically illustrates an example apparatus in which implementations of the disclosure may operate.

FIG. 2 illustrates an example apparatus 200 in which implementations of the disclosure may operate. The apparatus 200 may be the same or similar to one of the server computing device 110, the client computing device 160, or other computing device within the distributed computing system 100 described with respect to FIG. 1. Apparatus 200 may include components and modules for enabling additional metrics in a monitoring system to diagnose problems. The apparatus 200 may include a data store 210 that can store first metric data 220, a first collection frequency 221, a first boundary 222, a first metric rule 223, second metric data 224, a second collection frequency 225, and a third collection frequency. The data store 210 may include any non-persistent data storage (e.g., memory), persistent data storage (e.g., flash storage, hard drive, tape), other medium, or combination thereof that is capable of storing instructions for carrying out the operations of the components and modules discussed herein.

The apparatus 200 may include a processing device 230 with a metric data collector 240, a boundary violation determiner 242, and a metric data collection terminator 244. The metric data collector 240 can collect first metric data 220 at a first collection frequency 221, where the first metric data 220 is generated by a managed resource 215 communicably coupled to the apparatus 200. The boundary violation determiner 242 may determine whether the first metric data 220 exceeds a first boundary 222 defined by a first metric rule 223.

The metric data collector 240 can then, responsive to the boundary violation determiner 242 determining that the first metric data 220 exceeds the first boundary 222, collect second metric data 224 at a second collection frequency 225 and collect the first metric data 220 at a third collection frequency 226. The second metric data 224 may be generated by the managed resource 215. The second metric data 224 and the third collection frequency 226 may also be identified by the first metric rule 223. The boundary violation determiner 242 may then, subsequent to the metric data collector 240 collecting the second metric data 224, determine whether the first metric data 220 no longer exceeds the first boundary 222. The metric data collection terminator 244 may, responsive to the boundary violation determiner 242 determining the first metric data 220 no longer exceeds the first boundary 222, terminate collection of the second metric data 224 and collect the first metric data 220 at the first collection frequency 221.

FIGS. 3, 4A, 4B, and 5 depict flow diagrams for illustrative examples of methods 300 and 400 for enabling additional metrics in a monitoring system to diagnose problems. Method 300 includes a method of enabling and disabling additional metrics in a monitoring system to diagnose problems. Method 400 includes a method of enabling and disabling a nested chain of metrics in a monitoring system to diagnose problems. Method 500 includes another method of enabling and disabling additional metrics in a monitoring system to diagnose problems. Methods 300, 400, and 500 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300, 400, and 500 may each be performed by a single processing thread. Alternatively, methods 300, 400, and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300, 400, and 500 may be performed by a server computing device, specifically systems management server 110, as shown in FIG. 1.

Figure 3:
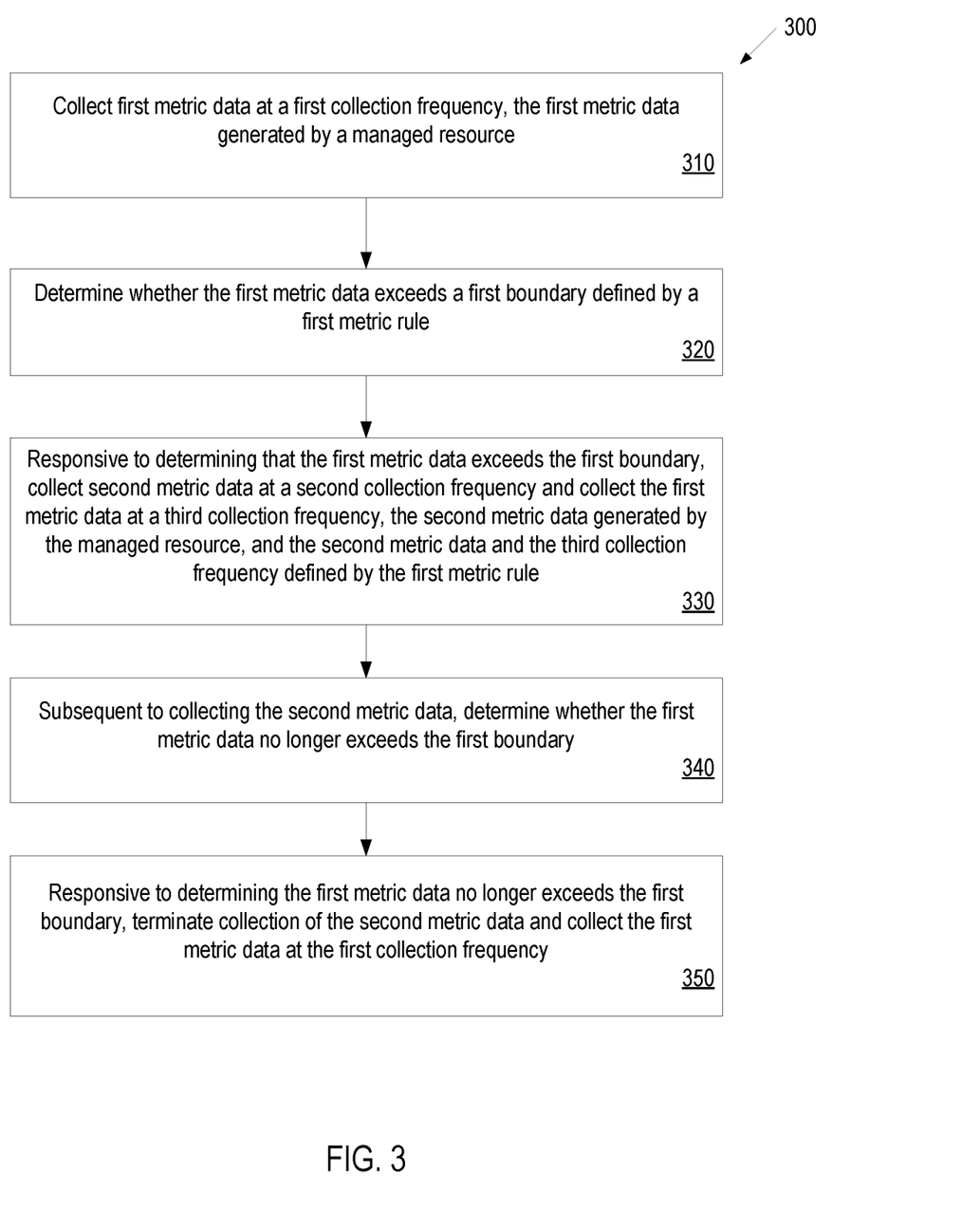
FIG. 3 depicts a flow diagram of a method for enabling additional metrics in a monitoring system to diagnose problems, in accordance with one or more aspects of the disclosure.

Referring to FIG. 3, method 300 may be performed by processing devices of a computing device and may begin at block 310. At block 310, a processing device may collect first metric data at a first collection frequency. In one implementation, the first metric data generated by a managed resource that is communicably coupled to the system management server. At block 320, the processing device may determine that the first metric data exceeds a first boundary defined by a first metric rule.

Subsequently, at block 330, the processing device may collect, responsive to determining that the first metric data exceeds the first boundary and without user intervention, second metric data at a second collection frequency and collect the first metric data at a third collection frequency. In one implementation, the second metric data generated by the managed resource, and the second metric data and the third collection frequency identified by the first metric rule. At block 340, the processing device may determine, subsequent to collecting the second metric data, that the first metric data no longer exceeds the first boundary. Lastly, at block 350, the processing device may terminate, responsive to determining the first metric data no longer exceeds the first boundary and without user intervention, collection of the second metric data and collect the first metric data at the first collection frequency.

Figure 4A:
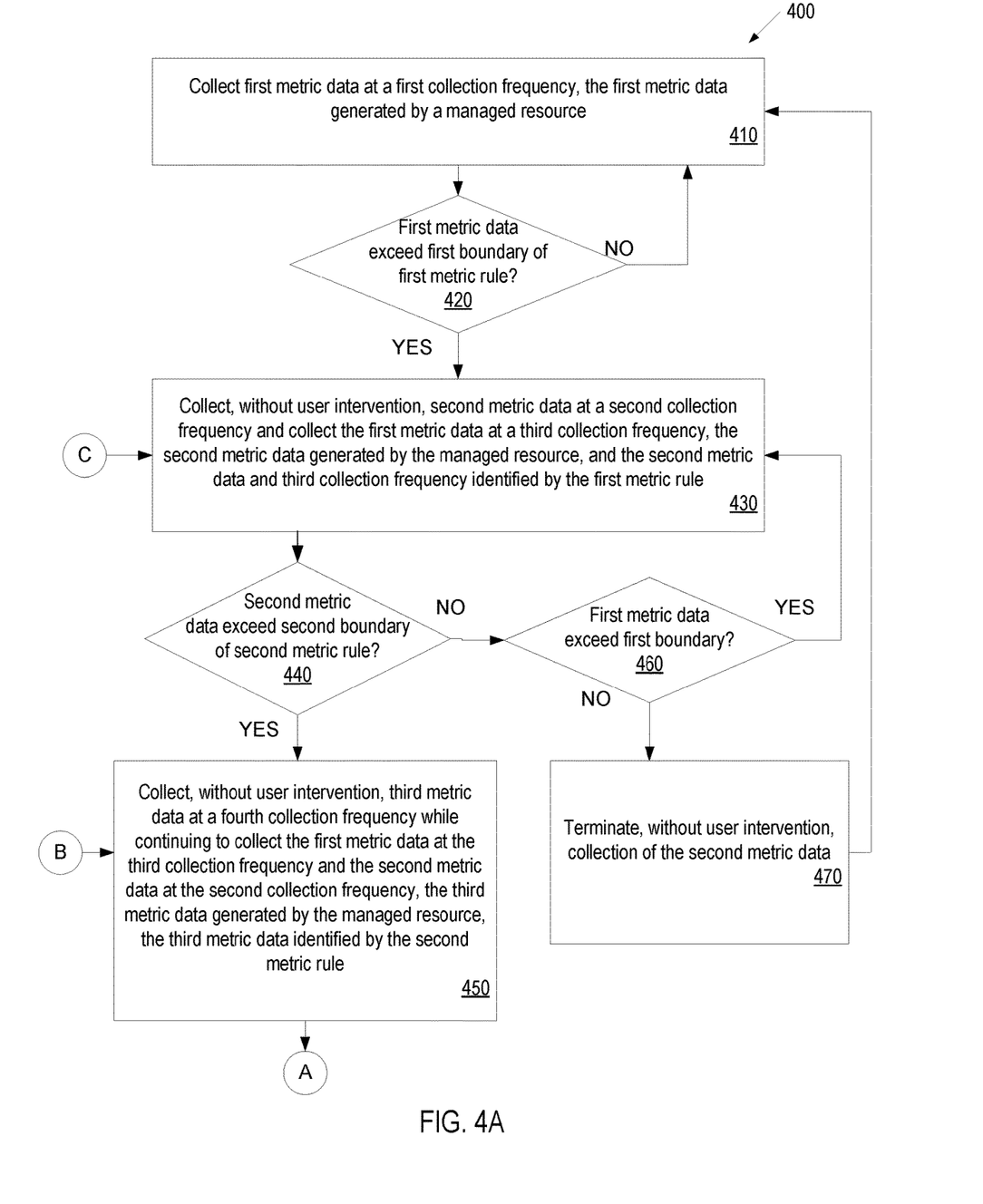
FIGS. 4A and 4B depict flow diagrams of another method for enabling additional metrics in a monitoring system to diagnose problems, in accordance with one or more aspects of the disclosure.
Figure 4B:
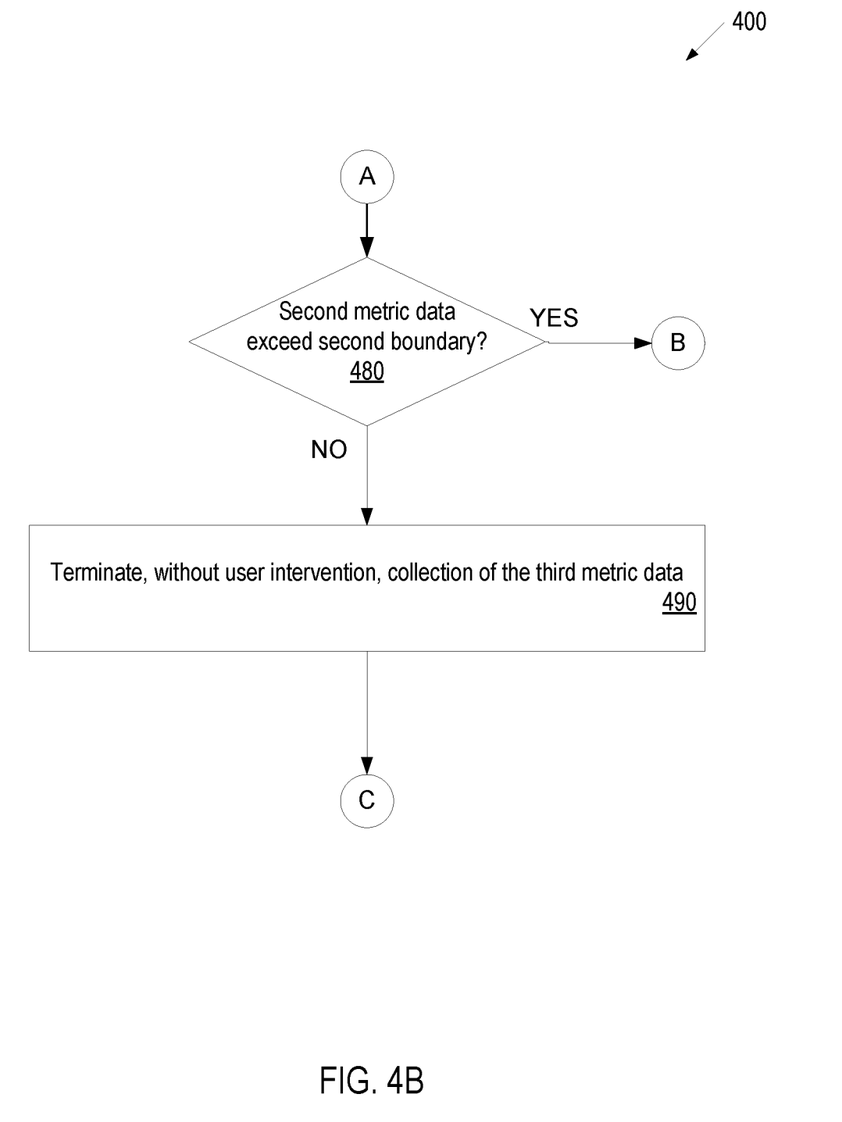

Referring to FIGS. 4A and 4B, method 400 may be performed by processing devices of a computing device and may begin at block 410. At block 410, a processing device may collect first metric data at a first collection frequency, where the first metric data corresponds to a first metric. In one implementation, the first metric data is generated by a managed resource that is communicably coupled to a systems management server having the processing device. At decision block 420, the processing device determines whether the first metric data exceeds a first boundary. In one implementation, the first boundary is defined by a first metric rule corresponding to the first metric.

If the first metric data does not exceed the first boundary at decision block 420, the method 400 returns to block 410 to continue collecting the first metric data. On the other hand, if the first metric data does exceed the first boundary at decision block 420, the method 400 proceeds to block 430. At block 430, the processing device may collect, without user intervention, second metric data (corresponding to a second metric) at a second collection frequency and collect the first metric data at a third collection frequency. In one implementation, the second metric data is generated by the managed resource. The second metric data and the third collection frequency are identified by the first metric rule.

Subsequently, at decision block 440, the processing device may determine whether the second metric data exceeds a second boundary defined by a second metric rule. If not, then method 400 proceeds to decision block 460 where the processing determines whether the first metric data exceeds the first boundary. If so, then method 400 returns to block 430 to continue collecting the first and second metric data. If the first metric data does not exceed the first boundary at decision block 460 (i.e., first metric data is now "in bounds"), then method 400 continues to block 470 where the processing device may terminate the collection of the second metric data without user intervention. Method 400 then returns to block 410 to continue collecting the first metric data at the first collection frequency.

Referring back to decision block 440, if the second metric data does exceed the second boundary, then method 400 proceeds to block 450 where the processing device may collect, without user intervention, third metric data (corresponding to a third metric) at a fourth collection frequency while continuing to collect the first metric data at the third collection frequency and the second metric data at the second collection frequency. In one implementation, the third metric data is generated by the managed resource. The third metric data is identified by the second metric rule.

Method 400 then proceeds to decision block 480 where the processing device determines whether the second metric data exceeds the second boundary. If so, method 400 returns to block 450 and proceeds by continuing to collect the first, second, and third metric data as described above. On the other hand, if the second metric data does not exceed the second boundary (e.g., second metric data is now "in bounds"), then method 400 proceeds to block 490 where the processing device may terminate, without user intervention, collection of the third metric data. Method 400 then returns to block 430 to continue collecting the first and second metric data as described above.

Figure 5:
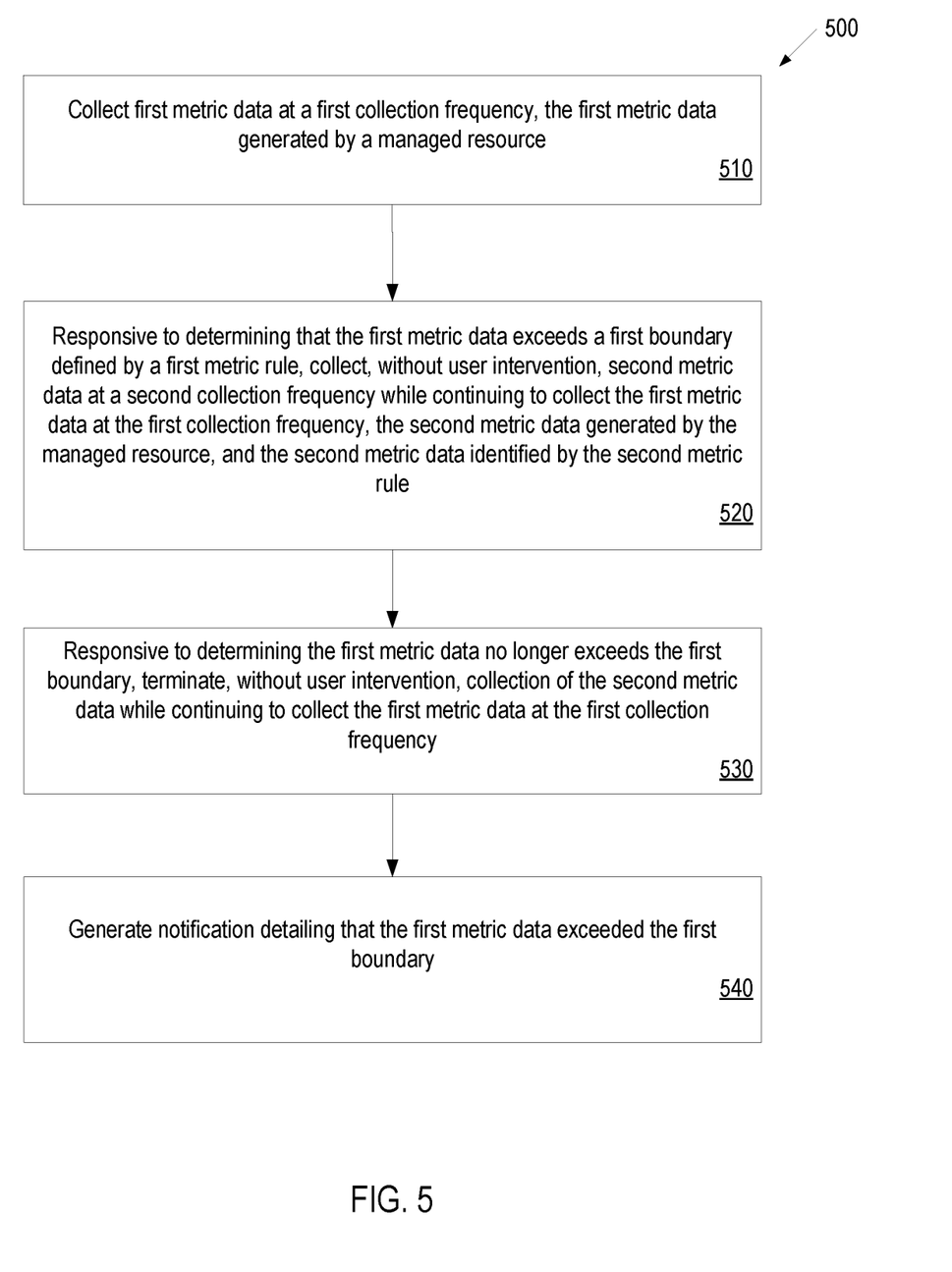
FIG. 5 depicts a flow diagram of another method for enabling additional metrics in a monitoring system to diagnose problems, in accordance with one or more aspects of the disclosure.

Referring to FIG. 5, method 500 may be performed by processing devices of a computing device and may begin at block 510. At block 510, a processing device may collect first metric data at a first collection frequency. In one implementation, the first metric data generated by a managed resource that is communicably coupled to the system management server. At block 520, the processing device may, without user intervention and responsive to determining that the first metric data exceeds a first boundary defined by a first metric rule, collect second metric data at a second collection frequency while continuing to collect the first metric data at the first collection frequency. In one implementation, the second metric data generated by the managed resource, and the second metric data identified by the first metric rule.

Subsequently, at block 530, the processing device may terminate, responsive to determining the first metric data no longer exceeds the first boundary and without user intervention, collection of the second metric data while continuing to collect the first metric data at the first collection frequency. Lastly, at block 540, the processing device may generate a notification that the first metric data exceeded the first boundary.

Figure 6:
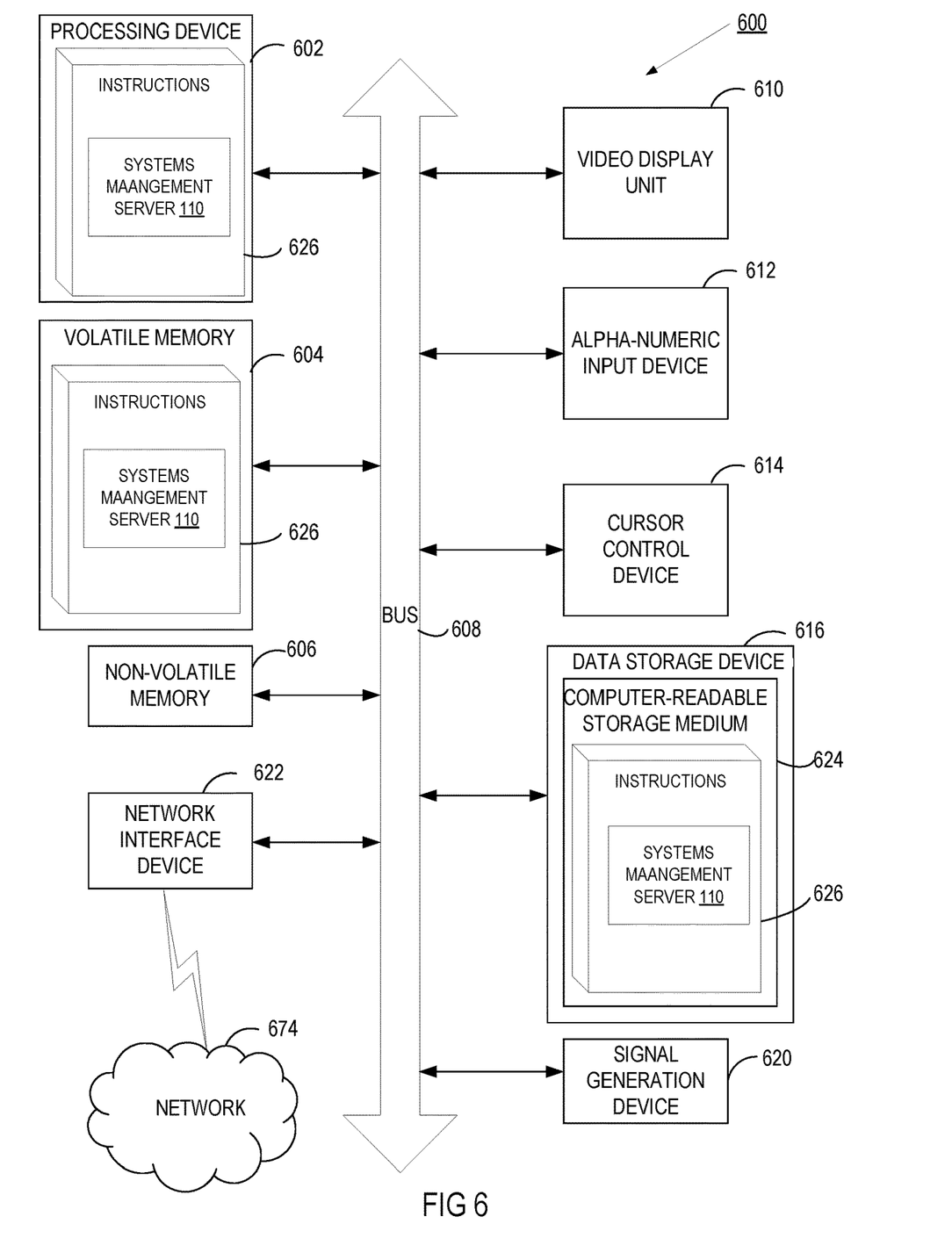
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device, such as systems management server 110 and/or management resource 160, within distributed computing system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for a systems management server 110 of FIG. 1 for implementing methods 300, 400, or 500.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
    implementing a first level of a metric chain defined by metric chain data, wherein the metric chain data stores identification of metrics, corresponding levels of the metrics, and respective collection frequencies specified for the levels of metrics;
    collecting, by a processing device of a systems management server, first metric data of the first level of the metric chain at a first collection frequency specified for the first level in the metric chain data, the first metric data generated by a managed resource;
    responsive to determining that the first metric data exceeds a first boundary defined by a first metric rule, implementing a second level of the metric chain by:
        collecting, by the processing device, second metric data of the second level at a second collection frequency specified for the second level in the metric chain data; wherein the second metric: data generated by the managed resource; and
        collecting the first metric data at a third collection frequency specified in the metric chain data for first metric data at the second level;
    storing, in the metric chain data, a level of nesting of the metric chain for each set of enabled metrics in the metric chain; and
    responsive to determining that the first metric data no longer exceeds the first boundary, unwinding, in accordance with the stored level of nesting of the metric chain, the metric chain to a previous level of the metric chain by terminating collection of metric data collected at a current level and resuming collecting metric data of the previous level at the first collection frequency of the previous level.

2. The method of claim 1, further comprising: determining whether the second metric exceeds a second boundary defined by a
    second metric rule;
        responsive to determining that the second metric data exceeds the second boundary, implementing a third level of the metric chain by:
            collecting, by the processing device, third metric data of the third level at a fourth collection frequency, specified for the third level in the metric chain data, while continuing to collect the first metric data at the third collection frequency and the second metric data at the second collection frequency, the third metric data generated by the managed resource;
subsequent to collecting the third metric data, determining whether the second metric data no longer exceeds the second boundary; and
responsive to determining the second metric data no longer exceeds the second boundary, unwinding the metric chain to the previous level of the metric chain by terminating collection of metric data collected at a current level and resuming collecting metric data of the previous level at the collection frequency of the previous level.

3. The method of claim 1, further comprising generating an alert detailing that the first metric data exceeded the first boundary and detailing collected values of the first metric data and the second metric data.

4. The method of claim 1, wherein exceeding the first boundary by the first metric data indicates occurrence of a problem at the managed resource.

5. The method of claim 1, wherein the metric data comprises at least one of number of running threads, amount of free disk space on a file system, current network adapter throughput, number of processes currently running on an operating system, number of queries executed by a database, request response time for an application, disk space used by an application, or memory used by an application.

6. The method of claim 1, wherein the first collection frequency and the third collection frequency are the same.

7. The method of claim 1, further comprising, responsive to determining that the first metric data exceeds the first boundary, implementing a third level of the metric chain by collecting, by the processing device without user intervention, third metric data of the third level at a fourth collection frequency, specified for the third level by the metric chain data, while continuing to collect the first metric data at the third collection frequency, wherein the third metric data generated by the managed resource.

8. The method of claim 1, wherein the first metric rule is defined by a user of the systems management server prior to collecting the first metric data and stored in a data store accessible by the systems management server.

9. The method of claim 1, wherein collecting the second metric data and terminating the collection of the second metric data is performed by the processing device without user intervention.

10. A system comprising, a memory; and
a processing device operatively coupled to the memory, the processing device to:
implement a first level of a metric chain defined by metric chain data, wherein the metric chain data stores identification of metrics, levels of the metrics and respective collection frequencies specified for the levels of metrics;
collect first metric data of the first level of the metric chain at a first collection frequency specified for the first level in the metric chain data, the first metric data generated by a managed resource;
determine whether the first metric data exceeds a first boundary defined by a first metric rule;
responsive to determining that the first metric data exceeds the first boundary, implement a second level of the metric chain by:
collecting second metric data of the second level at a second collection frequency specified for the second level in the metric chain data, wherein the second metric data generated by the managed resource; and
collecting the first metric data at a third collection frequency specified in the metric chain data for first metric data at the second level;
store, in the metric chain data, a level of nesting of the metric chain for each set of enabled metrics in the metric chain;
subsequent to collecting the second metric data, determine whether the first metric data no longer exceeds the first boundary defined by the first metric rule; and
responsive to determining that the first metric data no longer exceeds the first boundary, unwind, in accordance with the stored level of nesting of the metric chain, the metric chain to a previous level of the metric chain by terminating collection of metric data collected at a current level and resuming collecting metric data of the previous level at the first collection frequency of the previous level.

11. The system of claim 10, wherein the processing device is further to:
determine whether the second metric exceeds a second boundary defined by a second metric rule;
responsive to determining that the second metric data exceeds the second boundary, implement a third level of the metric chain by collecting third metric data of the third level at a fourth collection frequency, specified for the third level in the metric chain data, while continuing to collect the first metric data at the third collection frequency and the second metric data at the second collection frequency; the third metric data generated by the managed resource;
subsequent to collecting the third metric data, determining whether the second metric data no longer exceeds the second boundary; and
responsive to determining the second metric data no longer exceeds the second boundary, unwind the metric chain to the previous level of the metric chain by terminating collection of metric data collected at a current level and resuming collecting metric data of the previous level at the collection frequency of the previous level.

12. The system of claim 10, wherein the processing device is further to generate a notification detailing that the first metric data exceeded the first boundary and detailing collected values of the first metric data and the second metric data.

13. The system of claim 10, wherein the metric data comprises at least one of number of running threads, amount of free disk space on a file system, current network adapter throughput, number of processes currently running on an operating system, number of queries executed by a database, request response time for an application, disk space used by an application, or memory used by an application.

14. The system of claim 10, wherein the first collection frequency and the third collection frequency are the same.

15. The system of claim 10, wherein the processing device is further to, responsive to determining that the first metric data exceeds the first boundary, implement a third level of the metric chain by collecting, without user intervention, third metric data of the third level at a third collection frequency, specified for the third level by the metric chain data, while continuing to collect the first metric data at the first collection frequency, wherein the third metric data generated by the managed resource.

16. The system of claim 10, wherein the first metric rule is defined by a user of the system prior to collecting the first metric data and stored in a data store accessible by the system.

17. The system of claim 10, wherein the processing device to collect the second metric data and to terminate the collection of the second metric data is performed by the processing device without user intervention.

18. A non-transitory machine-readable storage medium storing instructions that cause a processing device to:

implement, by the processing device of a systems management server, a first level of a metric chain defined by metric chain data, wherein the metric chain data stores identification of metrics, levels of the metrics and respective collection frequencies specified for the levels of metrics;

collect, by the processing device, first metric data of the first level of the metric chairs at a first collection frequency specified for the first level in the metric chain data, the first metric data generated by a managed resource;

responsive to determining that the first metric data exceeds a first boundary defined by a first metric rule, implement a second level of the metric chain by collecting, by the processing device without user intervention, second metric data of the second level at a second collection frequency, specified for the second level in the metric chain data, while continuing to collect the first metric data at the first collection frequency, the second metric data generated by the managed resource, and the second metric data identified by the first metric rule;

store, in the metric chain data, a level of nesting of the metric chain for each set of enabled metrics in the metric chain; and responsive to determining the first metric data no longer exceeds the first boundary, unwind, in accordance with the stored level of nesting of the metric chain, the metric chain to a previous level of the metric chain by terminating, by the processing device without user intervention, collection of metric data collected at a current level and resuming collection of metric data of the previous level at the first collection frequency of the previous level; and generate a notification detailing that the first metric data exceeded the first boundary.

19. The non-transitory machine-readable storage medium of claim 18, wherein the processing device is further to:

determine whether the second metric exceeds a second boundary defined by a second metric rule;

responsive to determining that the second metric data exceeds the second boundary, implement a third level of the metric chain by collecting, without user intervention, third metric data of the third level at a third collection frequency, specified for the third level in the metric chain data, while continuing to collect the first metric data at the third collection frequency and the second metric data at the second collection frequency, the third metric data generated by the managed resource;

subsequent to collecting the third metric data, determining whether the second metric data no longer exceeds the second boundary; and responsive to determining the second metric data no longer exceeds the second boundary, unwinding the metric chain to the previous level of the metric chain by terminating collection of metric data collected at a current level and resuming collecting metric data of the previous level at the collection frequency of the previous level.

20. The non-transitory machine-readable storage medium of claim 18, wherein the processing device is further to transmit the notification, wherein the notification further details collected values of the first metric data and the second metric data.

21. The non-transitory machine-readable storage medium of claim 18, wherein the metric data comprises at least one of number of running threads, amount of free disk space on a file system, current network adapter throughput, number of processes currently running on an operating system, number of queries executed by a database, request response time for an application, disk space used by an application, or memory used by an application.

22. The non-transitory machine-readable storage medium of claim 18, wherein the processing device is further to, responsive to determining that the first metric data exceeds the first boundary, implement a third level of the metric chain by collecting, without user intervention, third metric data of the third level at a third collection frequency, specified for the third level by the metric chain data, while continuing to collect the first metric data at the first collection frequency, wherein the third metric data generated by the managed resource.

* * * * *